United States Patent [19]

Hall

[11] 4,058,902

[45] Nov. 22, 1977

[54] DOOR HINGE TEMPLATE

[76] Inventor: Roy W. Hall, 1813 Beth Drive, Longview, Tex. 75601

[21] Appl. No.: 645,375

[22] Filed: Dec. 30, 1975

[51] Int. Cl.$^2$ .......................... G01B 3/00; E06B 3/00
[52] U.S. Cl. ................................. 33/189; 33/174 G; 33/194
[58] Field of Search ................. 33/194, 189, 191, 192, 33/197, 174 J, 174 G

[56] References Cited

U.S. PATENT DOCUMENTS

| 2,435,256 | 2/1948 | Whitmore | 33/189 X |
| 2,821,027 | 1/1958 | Billhimer | 33/189 |

FOREIGN PATENT DOCUMENTS

| 2,964 of | 1853 | United Kingdom | 33/189 |

Primary Examiner—Richard E. Aegerter
Assistant Examiner—Willis Little

Attorney, Agent, or Firm—Larson, Taylor and Hinds

[57] ABSTRACT

A door hinge template is disclosed for locating and marking screw holes for hinges used for mounting doors. The template comprises a rectangular frame having a large rectangular central opening that is defined by two longitudinal and two transverse edge members. Each edge member has a rectangular central opening located in the corresponding longitudinal or transverse direction. Two measuring frames mounting a positioning rod are themselves slidably mounted in the transverse openings. Slidably mounted in one of the two longitudinal openings are a pair of positioning rods for gauging the transverse position of the hinge screw holes. The hinge screw holes are indicated by an equal number of pointers slidably mounted for movement in a transverse direction in the central opening of a corresponding frame. The frame is in turn slidably mounted for movement in the longitudinal direction in the longitudinally extending openings in the edge members.

5 Claims, 3 Drawing Figures

U.S. Patent      Nov. 22, 1977      4,058,902
FIG. 1
FIG. 2
FIG. 3
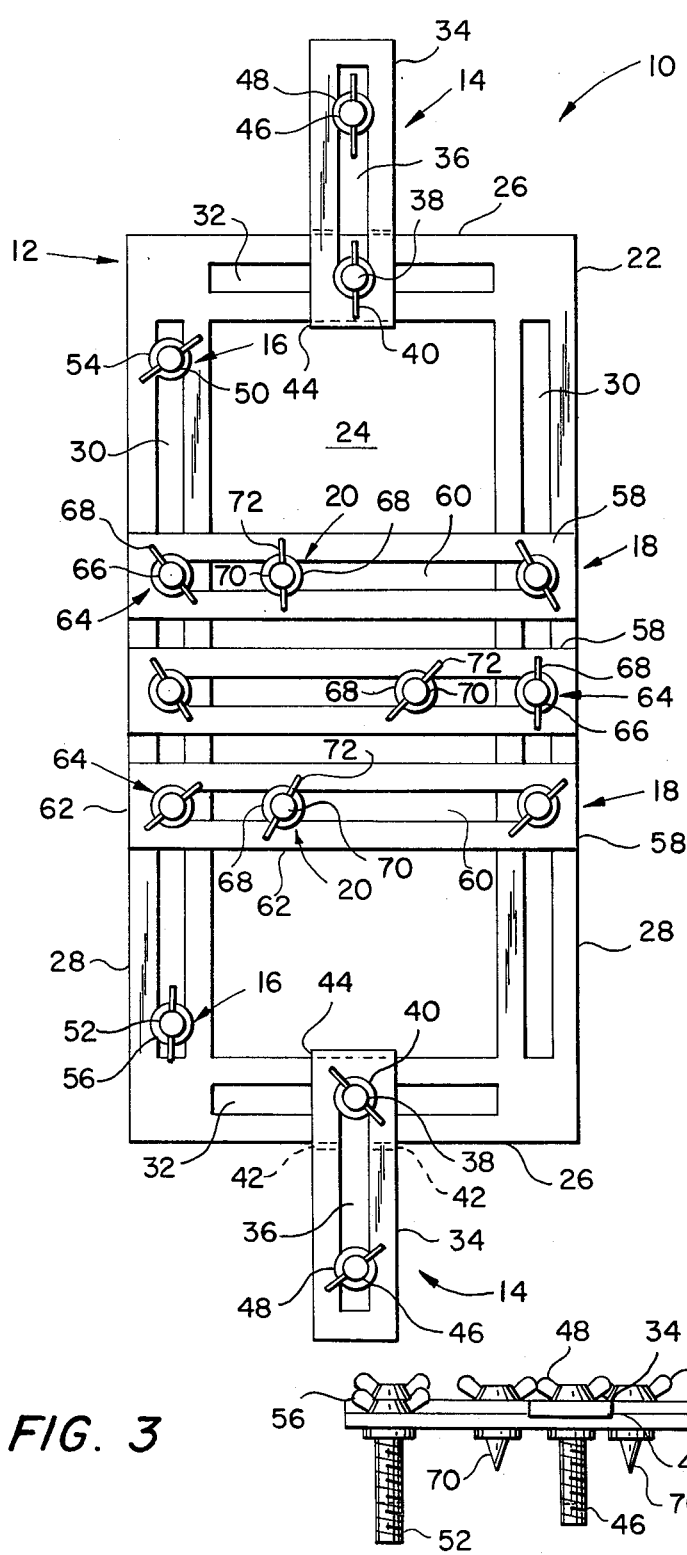
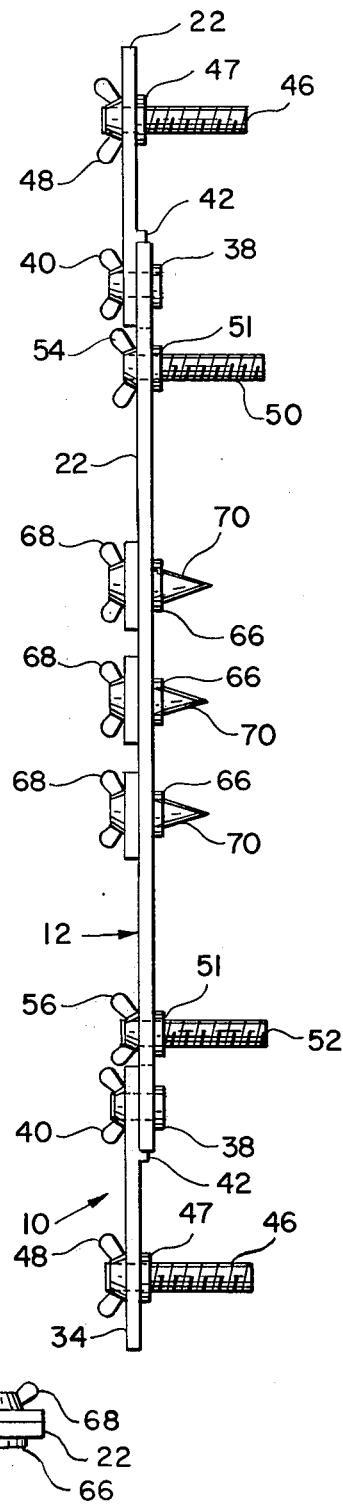

DOOR HINGE TEMPLATE

BACKGROUND OF THE INVENTION

1. Field of the Invention

This invention relates to gauges and templates and more particularly relates to templates for locating and marking screw holes for hinges and latches used to mount doors on a frame. However, it should be understood that the present invention may be used in other marking operations such as the positioning of drapery or curtain brackets adjacent a window.

2. Description of the Prior Art

There are many devices in the prior art for locating and marking the position of hinge screw holes on door frames. In either the hanging of doors or of drapery and the like, it is first necessary to very accurately position the brackets with respect to the frames on which they are to be mounted. This can be done with measuring tape and the like or by using measuring devices known in the prior art. The problems which one must overcome in accurately positioning the screw holes include the large variety of hole sizes, number of holes per bracket or hinge, relative distance and location of screw holes, irregular surface contours on the hinge itself, spacing requirements on the frame on which the hinge is mounted, and the requisite for speed and accuracy.

U.S. Pat. Nos. disclosing devices for marking screw holes include the following: Zimmermann 349,330; Boese et al. 1,619,695; Lutz 2,203,992; Gray 2,842,860; Berta 2,949,798; Stepanek 3,324,907; and Paul 3,371,423. These prior art references were located in U.S. search classification, Class 33, subclasses 174, 185, 189, 194 and 197.

Although the aforementioned references all show marking gauges, each one has several disadvantages. Several of the references do not have the ability to vary the number of screw holes being located. Other references are extremely complex and consequently relatively expensive. Finally, many of the prior art devices are extremely complex to use and others require extensive set-up times.

SUMMARY OF THE INVENTION

The present invention overcomes these and other difficulties and disadvantages of the prior art and provides a measuring template that can greatly increase speed and accuracy in locating screw holes for hinges and will accommodate all presently marketed sizes and types of hinges. The present invention is easy to use, light in weight, easily and inexpensively manufactured, and, in one embodiment, provides a completely symmetrical device that can easily be used with either right hand of left hand designed doors.

A template in accordance with the presently preferred embodiment of the invention comprises an elongate base member having a central opening and peripheral edge members. First and second measuring means respectively measure distances in the longitudinal direction and the transverse direction with respect to the base member. An adjustable indicating means is mounted on an adjustable member for indicating within the central opening the desired location of a point to be marked. The adjustable member is in turn slidably mounted on the peripheral edge members of the base member.

Other features and advantages of the present invention will be set forth in or apparent from the detailed description of the preferred embodiment of the invention found hereinbelow.

BRIEF DESCRIPTION OF THE DRAWINGS

FIG. 1 is a plan view of the presently preferred embodiment of the invention;

FIG. 2 is a side elevation view of the template shown in FIG. 1; and

FIG. 3 is an end elevation view of the template shown in FIG. 1.

DESCRIPTION OF THE PREFERRED EMBODIMENT

With reference to the figures, a presently preferred embodiment of a door hinge template 10 according to the present invention is set forth therein wherein like numerals indicate like elements in the several views. Template 10 comprises an elongate base member 12, a first locating or measuring means 14 mounted on base member 12 for locating or measuring distances in the longitudinal direction, a second locating or measuring means 16 also mounted on base member 12 for locating or measuring distances in the transverse direction, a plurality of adjustable members 18 slidably mounted on base member 12, and a plurality of indicating means 20 equal in number and individual to adjustable members 18 which are adjustably mounted thereon for indicating the desired location of the screw holes of a door hinge.

Base member 12 comprises a rectangular plate 22 having a large concentric central opening 24 therein. Thus, plate 22 is comprised of parallel peripheral end members 26 and parallel peripheral side members 28, the end members 26 and side members 28 being mutually perpendicular. Each side member 28 has a rectangular central opening 30 that extends in the longitudinal direction, the two central openings being mutually parallel to one another and to the sides of plate 22. End members 26 similarly have rectangular central openings 32 that extend in a transverse direction and are mutually parallel to each other and to the ends of base member 12. In one embodiment of the invention, plate 22 is stamped out of one-sixteenth inch thick metal plate and is 2 inches wide by 4 inches long. Naturally, plate 22 can be made from other rigid materials such as plastic and finished cardboard. In any event, as can be seen from the drawing, base member 12 is symmetrical about both the longitudinal axis and the transverse axis and has a planar top side and a planar bottom side.

Template 10, in the preferred embodiment of the invention shown in FIG. 1, comprises two longitudinal measuring means 14, each measuring means being slidably mounted at corresponding ends of template 10. Each longitudinal measuring means 14 comprises an elongate rectangular frame 34 having a concentric rectangular central opening 36 the edges of which are mutually parallel with corresponding edges of frame 34. Means for mounting one end of frame 34 to plate 22, such as a stove bolt 38 extending upwardly through end central opening 32 and frame central opening 36, slidably mounts frame 34 to plate 22. A wing nut 40 is threaded onto a stove bolt 38 and provides a means for removably rigidly attaching frame 34 to base member 12. In one embodiment of the invention, a pair of bosses 42 and a further boss 44 depend from frame 34 and slidably engage the respective sides of end members 26. Bosses 42 and 44 maintain frame 34 in a perpendicular alignment with end member 26. Slidably mounted in the frame opening 36 is a positioning rod 46 for gauging the distance from the top or bottom of a frame on which a hinge is to be mounted to the area where the hinge screw holes are to be located. Positioning rod 46 depends perpendicularly with respect to base member 12 and is removably rigidly attached at any desired position in frame central opening 36 with a wing nut 48.

Second measuring means 16 comprises first and second positioning rods 50 and 52 generally located at and depending from one of the side central openings 30 at each end thereof, respectively. Positioning rods 50 and 52 are removably rigidly attached to side member 28 with wing nuts 54 and 56, respectively. Although positioning rods 50 and 52 are shown located in the left hand side member 28 as seen in FIG. 1, for certain applications, the positioning rods 50 and 52 are located in the right hand side member 28. It is noted for exemplary purposes only that positioning rods 50 and 52 can simply be a one-eighth inch by one-half inch stove bolt.

In the embodiment of the invention shown in the figures, there are three adjustable members 18 and three corresponding indicating means 20. Each adjustable member 18 comprises an elongate, rectangular guide plate 58 having a rectangular central opening 60 defined by four integral peripheral edge members 62 and two adjustable fastening members 64. Fastening members 64 are similar to stove bolts 38 and comprise a stove bolt and wing nut combination 66 and 68, respectively. Each stove bolt 66 extends upwardly through side central opening 30 and guide plate central opening 60. Thus, adjustable members 18 can be slidably positioned in a longitudinal direction anywhere along side central opening 30 and can be removably rigidly attached to base member 12 with fastening members 64. For exemplary purposes only, it is noted that typical stove bolts 66 can be a one-eighth inch by one-fourth inch bolt.

Slidably mounted for movement in the transverse direction in guide plate central opening 60 is an elongate marking pointer 70. Marking pointer 70 depends substantially perpendicular to the face of base member 12 and is removably rigidly attached thereto with a wing nut 72. Typical dimensions of marker pointer 70, for exemplary purposes only, are one-eighth inch by three-sixteenth inch. In a further embodiment of the invention, it is noted that marker pointer 70 could be replaced by a hollow cylindrical tube that is slidably mounted on guide plate 58 and depends a short distance below the bottom of plate 22. This further embodiment of the invention would provide an opening in which a marking implement such as a scribe or a writing implement (e.g., a pencil) could be inserted to mark the position of the screw holes. It is also noted that for those hinges which use four or more screw holes, additional adjustable members 18 and indicating means 20 could be slidably mounted onto base member 12.

Template 10 can be quickly and accurately used to determine the location of screw holes for mounting a hinge onto a door as follows. Template 10 is placed over the hinge to be mounted and guide plates 58 and marker pointers 70 are positioned so as to correspond with the location of the screw holes. Should the hinge require more than three screws, additional guide plates 58 and marker pointers are mounted on base member 12 as required. Positioning rods 46 are then positioned the desired longitudinal distance from the corresponding marker pointer 70. If the top hinge is to be marked on the door first, the lower measuring frame 34 is positioned out of the way to one side by loosening wing nut 40. The upper measuring frame 34 is then positioned the desired transverse distance from positioning rods 50 of the transverse measuring means 16. Template 10 is then positioned at the top of the door such that positioning rod 46 rests on the top of the door and positioning rods 52 abut the side of the door. Template 10, once it has been positioned, is then struck with a hammer thereby forcing marker pointer 70 into the door and making starter screw holes. The template is then used to make the holes at a similar location in the frame, positioning rod 46 being adjusted if necessary. In a similar manner, the upper measuring frame 34 is positioned out of the way and the lower measuring frame 34 is placed into position and the process is repeated for making holes for the lower door hinge in the door and in the frame respectively.

The foregoing invention has been described with respect to a presently preferred embodiment. As thus described, it is readily apparent that the present invention affords several advantages not disclosed in the prior art. These advantages include an inexpensive template that can be rapidly and accurately used for either starting or indicating the position of screw holes for mounting a door hinge onto a frame. In addition, the present invention provides a template that can easily be adjusted for different sized hinges with varying numbers of screw holes.

Although the invention has been described in detail with respect to exemplary embodiments thereof, it will be understood by those of ordinary skill in the art that variations and modifications may be effected within the scope and spirit of the invention.

I claim:

1. A hole locating template for use on frames and the like and comprising:

a substantially symmetrical, rectangular base member having at least one planar face, and having a central, elongated opening, and peripheral opposite longitudinally extending sides and peripheral opposite transversely extending ends that are mutually perpendicular to and integral with said sides, each said side and each said end having an elongated central opening defined by parallel edge elements such that each said peripheral side and end central opening extends parallel to the corresponding edge of said base member;

first locating means for locating a point in the longitudinal direction and comprising first and second elongated frames, each frame slidably mountable at one end thereof for movement in a transverse direction at a corresponding end of said base plate in the end central opening thereof and having at least one depending boss integral with said frame for engagement with one of said transverse edges of the corresponding said peripheral end for maintaining said frame substantially perpendicular to said peripheral end; means for removably, rigidly attaching said one end of each said frames through said end central opening of the corresponding peripheral end; and a first alignment means for each said frame which comprises an elongate first element adjustably, rigidly mountable to the other end of said frame such that said first element extends substantially perpendicular to said planar face of said base member;

second locating means for locating a point in the transverse direction, said second locating means comprising an elongate, second alignment means for gauging transverse distance from one of said longitudinal sides of said frame, said second alignment means comprising an elongate, second element extending substantially perpendicular to said planar face of said base member, means for slidably mounting said second element in said peripheral side central opening perpendicularly to said face of said base member and for removably rigidly attaching said second element to said peripheral side;

at least one elongated adjustable member extending transversely across said base member central opening and slidably mounted at each end thereof to the corresponding base member side; and adjustable indicating member mounted on said adjustable member for indicating within said base member central opening the desired location of the hole, said indicating member comprising an elongate marking pointer having a pointed one end and means for removably, rigidly attaching said pointer at the other end to said adjustable member such that said pointer extends substantially perpendicular to said planar face of said base member.

2. A template as claimed in claim 1 wherein said first and second frames of said first locating means comprises peripheral edge members defining a rectangular central opening and said first element extends through said frame central opening and is adjustably slidably mounted thereon.

3. A template as claimed in claim 1 wherein said adjustable member is comprised of an elongate frame having a central elongated opening defined by parallel edge elements such that said elongate frame central opening extends parallel to said base member ends.

4. A template as claimed in claim 3 and further comprising two adjustable fastening members for each adjustable member, said fastening members extending through said adjustable member central opening at each end thereof and through respective said central openings of said base member sides.

5. A template as claimed in claim 3 for marking screw holes of a hinge in the member to which the hinge is to be mounted wherein said template further comprises three adjustable members and at least three corresponding indicating means; and wherein each said indicating means comprises an elongate marking pointer slidably mounted at one end in said central opening of said adjustable member between said fastening members, said pointer extending substantially perpendicular to said face of said base member and having a pointed other end, and said indicating means comprises means for removably rigidly attaching said pointer to said adjustable member.

* * * * *